(12) United States Patent
Ishiyama

(10) Patent No.: US 7,126,571 B2
(45) Date of Patent: Oct. 24, 2006

(54) ELECTRODE DRIVING APPARATUS AND ELECTRONIC EQUIPMENT

(75) Inventor: Hisanobu Ishiyama, Chino (JP)

(73) Assignee: Seiko Epson Corporation(JP)

( * ) Notice: Subject to any disclaimer, the term of this patent is extended or adjusted under 35 U.S.C. 154(b) by 532 days.

(21) Appl. No.: 10/125,064

(22) Filed: Apr. 18, 2002

(65) Prior Publication Data

US 2002/0171638 A1   Nov. 21, 2002

(30) Foreign Application Priority Data

Apr. 19, 2001   (JP) ............................. 2001-120502

(51) Int. Cl.
G09G 5/00 (2006.01)
(52) U.S. Cl. ...................... 345/87; 345/204; 349/149; 349/150; 349/151
(58) Field of Classification Search .................. 345/86, 345/87, 88, 89, 90, 91, 92, 93, 94, 95, 97, 345/98, 100, 103, 211, 76; 349/139, 149–161
See application file for complete search history.

(56) References Cited

U.S. PATENT DOCUMENTS

| | | | |
|---|---|---|---|
| 4,687,300 A * | 8/1987 | Kubo et al. ............... | 349/151 |
| 5,592,199 A * | 1/1997 | Kawaguchi et al. ....... | 345/206 |
| 5,598,180 A * | 1/1997 | Suzuki et al. ............. | 345/100 |
| 6,300,997 B1 * | 10/2001 | Saito et al. ............... | 349/149 |
| 6,469,767 B1 * | 10/2002 | Onishi ...................... | 349/149 |
| 6,507,384 B1 * | 1/2003 | Endo et al. ............... | 349/149 |
| 6,756,975 B1 * | 6/2004 | Kishida et al. ........... | 345/204 |

| | | | |
|---|---|---|---|
| 2002/0044251 A1 * | 4/2002 | Togashi et al. .......... | 349/149 |

FOREIGN PATENT DOCUMENTS

| | | |
|---|---|---|
| JP | 3-71382 | 7/1991 |
| JP | 5-072560 | 3/1993 |
| JP | 5-181151 | 7/1993 |
| JP | 6-034987 | 2/1994 |
| JP | 6-034999 | 2/1994 |
| JP | 6-242462 | 9/1994 |
| JP | 07-049657 | 2/1995 |
| JP | 8-006058 | 1/1996 |
| JP | 8-022026 | 1/1996 |
| JP | 8-234235 | 9/1996 |
| JP | 8-278516 | 10/1996 |
| JP | 9-005779 | 1/1997 |
| JP | 11-133379 | 5/1999 |
| JP | 7-270825 | 10/1999 |
| JP | 2000221534 A * | 8/2000 |
| JP | 2000-259091 | 9/2000 |

(Continued)

OTHER PUBLICATIONS

Japanese Examination Result No. 2001-120502.

(Continued)

*Primary Examiner*—Richard Hjerpe
*Assistant Examiner*—Jean Lesperance
(74) *Attorney, Agent, or Firm*—Harness, Dickey & Pierce, P.L.C.

(57) ABSTRACT

An electrode driving apparatus includes first through third electrode patterns 21–23 arranged in a quadrilateral region 20, first through third wiring patterns 31–33, and first through third terminals 41–43. With the third wiring pattern 33 being defined as a boundary, the first terminal 41 is disposed on the side of the first wiring pattern 31, and the second terminal 42 is disposed on the side of the second wiring pattern 32. The third terminal 43 is disposed between the first terminal 41 and the second terminal 32.

23 Claims, 6 Drawing Sheets

FOREIGN PATENT DOCUMENTS

| | | |
|---|---|---|
| JP | 2001-005403 | 1/2001 |
| JP | 2001-091918 | 4/2001 |
| JP | 2001-194686 | 7/2001 |
| JP | 2002-189229 | 7/2002 |
| JP | 2002-244580 | 8/2002 |
| JP | 2002-311849 | 10/2002 |

OTHER PUBLICATIONS

Communication from Japanese Patent Office regarding counterpart application.

* cited by examiner

ELECTRODE DRIVING APPARATUS AND ELECTRONIC EQUIPMENT

BACKGROUND OF THE INVENTION

1. Technical Field of the Invention

The present invention relates to electrode driving apparatuses and electronic equipment.

2. Background Technology

In an active matrix type liquid crystal display apparatus, signal electrodes and scanning electrodes are formed in matrix on a first substrate, and opposing electrodes are formed on a second substrate disposed opposite to the first substrate. Also, wirings for supplying signals to the signal electrodes and the scanning electrodes are formed on the first substrate, and wirings for supplying signals to the opposing electrodes are also formed on the first substrate. In the past, there are occasions where the wirings cross one another, and in such a case, an appropriate measure such as the use of a multiple-layered substrate or the like is required. Such a problem occurs not only in the liquid crystal display apparatus, but also when multiple wires are routed.

The present invention is provided to solve these problems, and it is an object of the present invention to provide electrode driving apparatuses and electronic equipment that are capable of disposing multiple wirings without crossing one another.

SUMMARY OF THE INVENTION (1) An electrode driving apparatus in accordance with the present invention comprises:
  first and second electrode patterns arranged in a quadrilateral region;
  a first substrate having the first and second electrode patterns formed therein;
  a first wiring pattern electrically connected to the first electrode pattern and formed outwardly from a first side of the quadrilateral region;
  a second wiring pattern electrically connected to the second electrode pattern and formed outwardly from a second side adjacent to the first side of the quadrilateral region;
  a third wiring pattern formed outwardly from the quadrilateral region from a position closer to an apex defined between the first side and the second side than positions of the first and second wiring patterns to the apex;
  a second substrate disposed opposite to the first substrate;
  a third electrode pattern formed in the second substrate and electrically connected to the third wiring pattern; and
  at least one electronic component including a first terminal electrically connected to the first wiring pattern, a second terminal electrically connected to the second wiring pattern and a third terminal electrically connected to the third wiring pattern,
  wherein, with the third wiring pattern being defined as a boundary, the first terminal is disposed on the side of the first wiring pattern, the second terminal is disposed on the side of the second wiring pattern, and the third terminal is disposed between the first terminal and the second terminal.

According to the present invention, the first, second and third wiring patterns can be disposed without crossing one another.

(2) In the electrode driving apparatus, the first and second electrode patterns may be formed in a matrix.

(3) In the electrode driving apparatus, a third substrate may be mounted on the first substrate, the at least one electronic component may be mounted on the third substrate, and the first, second and third wiring patterns may be formed on the first substrate and the third substrate.

(4) In the electrode driving apparatus, the at least one electronic component may be mounted on the first substrate, and the first, second and third wiring patterns may be formed on the first substrate.

(5) In the electrode driving apparatus, the at least one electronic component may be an electronic component having the first, second and third terminals.

(6) In the electrode driving apparatus, the electronic component may be a peripheral type component with an arrangement order in which the third terminal is arranged between the first terminal and the second terminal.

(7) In the electrode driving apparatus, the electronic component may have an input terminal, and may be in an arrangement order in which the second terminal is disposed between the third terminal and the input terminal.

(8) In the electrode driving apparatus, the at least one electronic component may comprise a first electronic component provided with the first terminal and a second electronic component provided with the second terminal, and the third terminal may be provided on one of the first electronic component and the second electronic component.

(9) In the electrode driving apparatus, the first electronic component may be disposed adjacent to the first side, and the first electronic component may be disposed between the first side and the second electronic component.

(10) The electrode driving apparatus may further include a connection pattern that electrically connects the first and second electronic components, wherein the third wiring pattern may be disposed between the second wiring pattern and the connection pattern.

(11) In the electrode driving apparatus, the second electronic component may have an input terminal, and the second terminal may be disposed between the third terminal and the input terminal.

(12) The electrode driving apparatus may further comprise an electronic circuit that is electrically connected to the second wiring pattern.

(13) The electrode driving apparatus may further comprise an electronic circuit that is electrically connected to the third wiring pattern.

(14) In the electrode driving apparatus, two sides adjacent to both ends of the first side may define the second side, and the second wiring pattern may be formed from each of the two sides.

(15) In the electrode driving apparatus, the at least one electronic component may have a function to generate a signal to be outputted from at least one of the first, second and third terminals.

(16) In the electrode driving apparatus, the at least one electronic component may have a path that passes an input signal to at l east one of the first, second and third terminals.

(17) In the electrode driving apparatus, the path may pass a signal with a voltage higher than a power supply voltage of the at least one electronic component.

(18) In the electrode driving apparatus, the signal with a voltage higher than the power supply voltage may be a common voltage $V_{COM}$.

(19) The electrode driving apparatus may further comprise a fourth wiring pattern that is drawn out from a corner section of the quadrilateral region except the apex at which the third wiring pattern is formed and electrically connected to the third electrode pattern, and a fourth terminal provided on the at least one electronic component and electrically connected to the fourth wiring pattern.

(20) In the electrode driving apparatus, the fourth wiring pattern may be provided for supplying the common voltage $V_{COM}$.

(21) In the electrode driving apparatus, the second wiring pattern may be disposed between the third wiring pattern and the fourth wiring pattern.

(22) In the electrode driving apparatus, the at least one electronic component may have a function to generate a signal to be outputted from the fourth terminal.

(23) In the electrode driving apparatus, the at least one electronic component may have a path that passes an input signal to the fourth terminal.

(24) In the electrode driving apparatus, wherein the third wiring pattern may be for supplying a common voltage $V_{COM}$.

(25) In the electrode driving apparatus, an electrooptic material may be provided between the first substrate and the second substrate to form an electrooptic apparatus.

(26) In the electrode driving apparatus, a liquid crystal may be provided between the first substrate and the second substrate to form a liquid crystal apparatus.

(27) An electronic equipment in accordance with the present invention comprises the electrode driving apparatus described above.

DETAILED DESCRIPTION OF THE PREFERRED EMBODIMENTS OF THE PRESENT INVENTION

Embodiments of the present invention will be described with reference to the accompanying drawings.

(First Embodiment)

Figure 1A:
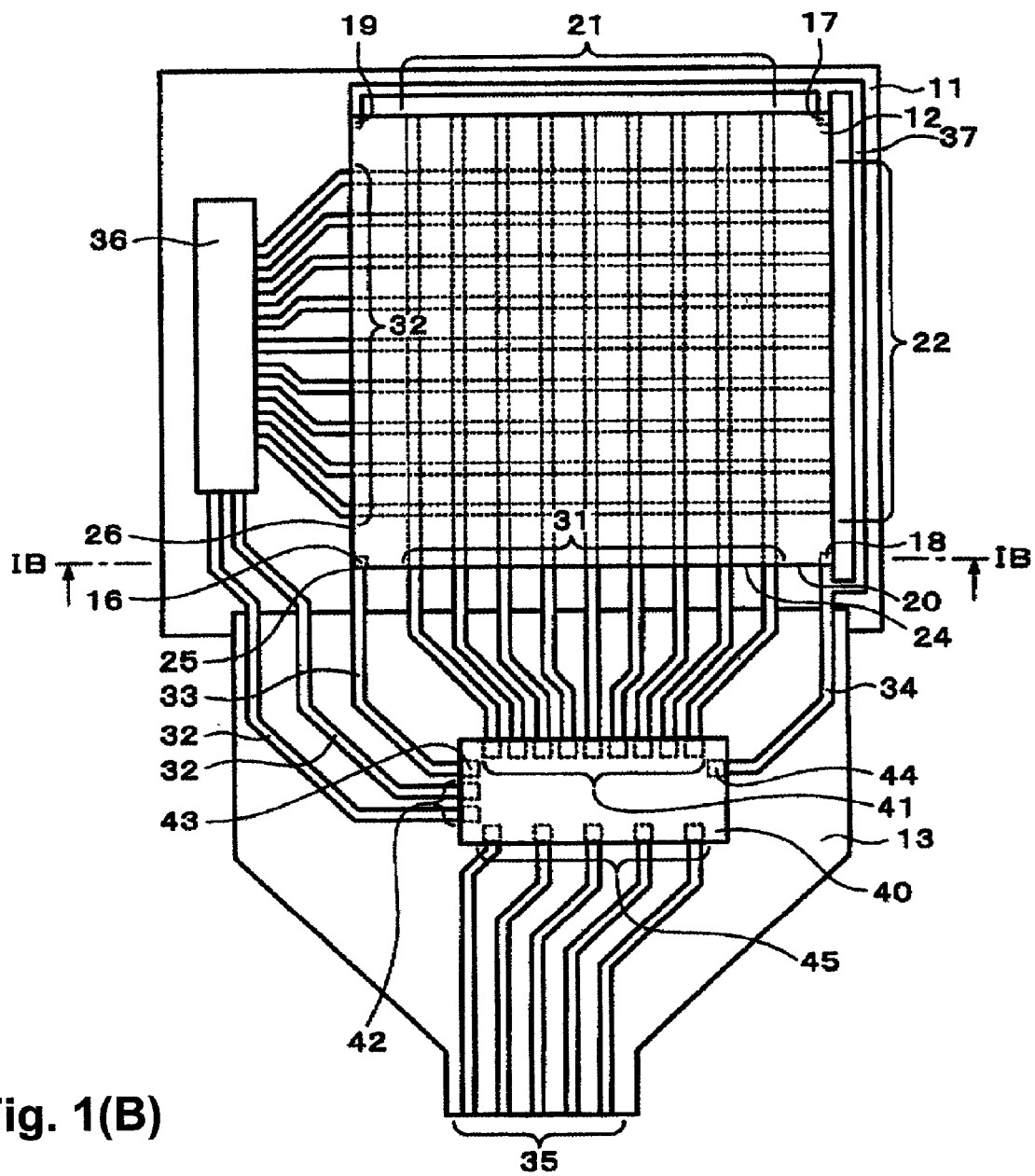
FIGS. 1(A)–1(B) show an electrode driving apparatus in accordance with a first embodiment of the present invention.
Figure 1B:
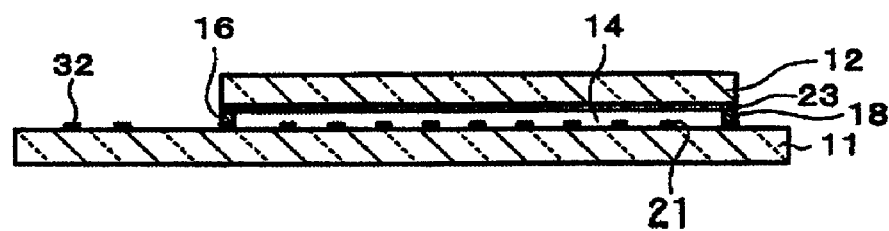

FIG. 1(A) shows an electrode driving apparatus in accordance with a first embodiment of the present invention, FIG. 1(B) is a cross-sectional view taken along lines IB—IB of FIG. 1(A).

The electrode driving apparatus includes a first substrate 11. A second substrate 12 is provided opposite to the first substrate 11. At least one of the first and second substrates 11 and 12 (only one or both of them) is a transparent substrate that is formed from glass or the like. The first and second substrates 11 and 12 are formed from electrically insulating material at least on their surfaces. The first and the second substrates 11 and 12 are not limited to a quadrilateral shape (including a rectangular shape) shown in FIG. 1(A). In the present embodiment, the first substrate 11 is larger than the second substrate 12.

In the present embodiment, the electrode driving apparatus includes a third substrate 13. The third substrate 13 is connected to the first substrate 11. A flexible substrate (film) may be used as the third substrate 13.

The electrode driving apparatus includes a first electrode pattern 21. The first electrode pattern 21 shown in FIG. 1(A) is formed from a plurality of electrodes extending in an up-and-down direction in the figure. In an active matrix type liquid crystal apparatus, the first electrode pattern 21 composes signal electrodes (or scanning electrodes). The electrode driving apparatus includes a second electrode pattern 22. The second electrode pattern 22 shown in FIG. 1(A) is formed from a plurality of electrodes extending in a left-to-right direction in the figure. In an active matrix type liquid crystal apparatus, the second electrode pattern 22 composes scanning electrodes (or signal electrodes). An active matrix type liquid crystal apparatus has pixel electrodes (not shown), and electrical connections of the signal electrodes and the pixel electrodes are turned on and off by active elements (for example, transistors) that are controlled through the scanning electrodes.

The first and second electrode patterns 21 and 22 may be formed in a matrix. In the present embodiment, the first and second electrode patterns 21 and 22 are formed in the first substrate 11. The first and second electrode patterns 21 and 22 are arranged in a quadrilateral region 20. In the example shown in FIG. 1(A), the quadrilateral region 20 is a region that is defined by an outer peripheral shape of the quadrilateral second substrate 12.

The electrode driving apparatus has a third electrode pattern 23. The third electrode pattern 23 is formed in the second substrate 12. In an active matrix type liquid crystal apparatus, the third electrode pattern 23 composes common electrodes. In this case, the third electrode pattern 23 is formed on a surface of the second substrate 12 on the side of the first substrate 11.

In the present embodiment, the electrode driving apparatus is an electrooptical apparatus (e.g., a liquid crystal apparatus, plasma display apparatus, electroluminescence display apparatus or the like), wherein an electrooptic material (e.g., liquid crystal, discharge gas, luminous material or the like) 14 is provided between the first and second substrates 11 and 12. The electrooptic material 14 is sealed by a sealing material (not shown). The electrode driving apparatus may be an electrode driving panel. The electrode driving panel may be an electrooptical panel (e.g., a liquid crystal panel, plasma display panel, electroluminescence display panel or the like).

The electrode driving apparatus has a first wiring pattern 31. The first wiring pattern 31 may be formed from a plurality of wirings. The first wiring pattern 31 is electrically connected to the first electrode pattern 21. The plurality of electrodes that compose the first electrode pattern 21 may be electrically connected to the respective plurality of wirings that compose the first wiring pattern 31. The first electrode pattern and the first wiring pattern 21 and 31 may be continuously formed in one piece. The first wiring pattern 31 is formed extending outwardly from a first side 24 of the quadrilateral region 20.

The electrode driving apparatus has a second wiring pattern 32. The second wiring pattern 32 may be formed from a plurality of wirings. The second wiring pattern 32 is electrically connected to the second electrode pattern 22. The plurality of electrodes that compose the second electrode pattern 22 may be electrically connected to the respective plurality of wirings that compose the second wiring pattern 32. The second electrode pattern and the second wiring pattern 22 and 32 may be continuously formed in one piece. The second wiring pattern 32 is formed extending outwardly from a second side 26 of the quadrilateral region 20. The second side 26 is adjacent to the first side 24.

The second wiring pattern 32 electrically connects to an electronic circuit 36. More specifically, the electronic circuit 36 is disposed between the second electrode pattern 22 and a second terminal 42. The electronic circuit 36 drives the second electrode pattern (for example, scanning electrodes) 22, and may be equivalent to a Y driver or a gate driver. When the electronic circuit 36 is in the form of a chip, the chip may be mounted on a substrate (which would correspond to the first substrate 11 in the example shown in FIG. 1(A)). The electronic circuit 36 may be formed from low-temperature polysilicon on a substrate (which would correspond to the first substrate 11 in the example shown in FIG. 1(A)).

A third wiring pattern 33 is formed extending from an apex 25 that is defined between the first and second sides 24 and 26 or an area adjacent thereto. In other words, the third wiring pattern 33 is formed in a position closer to the apex 25 than positions of the first and second wiring patterns 31 and 32 to the apex 25. The third wiring pattern 33 is formed outwardly extending from the quadrilateral region 20. The third wiring pattern 33 shown in FIG. 1(A) is composed of one wiring, but may be composed of a plurality of wirings. Also, the third wiring pattern 33 is electrically connected to the third electrode pattern 23 through an electrically conductive section 16.

The first through third wiring patterns 31–33 are disposed without intersecting one another. Also, the third wiring pattern 33 is disposed between the first wiring pattern 31 and the second wiring pattern 32.

In the present embodiment, a fourth wiring pattern 34 is formed extending from a corner section of the quadrilateral region 20 except the apex 25. Here, the "corner section" includes a corner of the quadrilateral region 20 and an area adjacent to the corner. The fourth wiring pattern 34 is formed extending outwardly from the quadrilateral region 20. The fourth wiring pattern 34 shown in FIG. 1(A) is composed of one wiring, but may be composed of a plurality of wirings. Also, the fourth wiring pattern 34 is electrically connected to the third electrode pattern 23 through an electrically conductive section 28.

The first through fourth wiring patterns 31–34 are formed on the first substrate 11. In the present embodiment, the first through fourth wiring patterns 31–34 are also formed on the third substrate 13. For example, a plurality of wiring patterns formed on the first substrate 11 and a plurality of wiring patterns formed on the third substrate 13 may be joined to one another to form the first through fourth wiring patterns 31–34. The joining may be conducted by the use of metal joining or anisotropic conductive material.

In the present embodiment, a fifth wiring pattern 35 is provided. The fifth wiring pattern 35 electrically connects an electronic component 40 to be described below and an external component. The fifth wiring pattern 35 is formed on the third substrate 13.

In the present embodiment, a sixth wiring pattern 37 is provided on the first substrate 11. The sixth wiring pattern 37 is electrically connected to the fourth wiring pattern 34. Also, the sixth wiring pattern 37 is electrically connected to the third electrode pattern 23 through electrically conductive sections 17 and 19. The electrically conductive sections 17 and 19 may each have the same structure as that of the electrically conductive sections 16 and 18. In the example shown in FIG. 1, the electrically conductive sections 16–19 are provided at four corners of the quadrilateral region 20, such that a common voltage $V_{COM}$ can be supplied from the four corners to the entire third electrode pattern 23. By this, the voltage on the third electrode pattern 23 can be quickly changed, and the uniformity of the voltage is improved.

The electrode driving apparatus has at least one electronic component 40. The electronic component 40 drives the first electrode pattern (for example, signal electrodes) 21, and may be equivalent to an X driver or a source driver. In the present embodiment, the electronic component 40 may have a function to control the electronic circuit 36. The electronic component 40 may include a RAM, a power supply circuit, an oscillation circuit or the like mounted thereon other than the function as a controller.

The electronic component shown in FIG. 1(A) is a peripheral type component having multiple terminals arranged around side sections thereof. The electronic component 40 is disposed adjacent to the first side 24. In the present embodiment, the electronic component 40 is mounted on the third substrate 13. The electronic component 40 may be mounted by a TAB (Tape Automated Bonding) method, or a facedown mounting method. It is called as a COF (Chip On Film) when the substrate on which it is to be mounted (the third substrate 13 in the example shown in FIG. 1(A)) is a film, and a COG (Chip On Glass) when the substrate is glass. A TCP (Tape Carrier Package) may be formed with the electronic component 40 and the substrate (the third substrate 13 in the example shown in FIG. 1(A)).

The electronic component 40 includes at least one (plural terminals in the example shown in FIG. 1(A)) first terminal 41. The first terminal 41 is electrically connected to the first wiring pattern 31. The electronic component 40 includes at least one (plural terminals in the example shown in FIG. 1(A)) second terminal 42. The second terminal 42 is electrically connected to the second wiring pattern 32. The electronic component 40 includes at least one (one in the example shown in FIG. 1(A) but may be plural terminals) third terminal 43. The third terminal 43 is electrically connected to the third wiring pattern 33.

The electronic component 40 includes at least one (one in the example shown in FIG. 1(A) but may be plural terminals) fourth terminal 44. The fourth terminal 44 is electrically connected to the fourth wiring pattern 34. The electronic component 40 includes at least one (plural terminals in the example shown in FIG. 1(A)) fifth terminal (input terminal) 45. The fifth terminal (input terminal) 45 is electrically connected to the fifth wiring pattern 35.

The electronic component 40 has a function to generate a signal to be outputted from at least one of the first through fourth terminals 41–44. For example, the electronic component 40 generates a voltage (common voltage $V_{COM}$) that is applied to the third electrode pattern (common electrode) 23, and outputs the same from the third terminal 43. In the example shown in FIG. 1, the common voltage $V_{COM}$ is also outputted from the fourth terminal 44, and applied to the third electrode pattern 23 through the fourth wiring pattern 34. Since the fourth wiring pattern 34 electrically connects to the sixth wiring pattern 37, the common voltage $V_{COM}$ is also applied to the third electrode pattern 23 through the sixth wiring pattern 37.

In the present embodiment, the third terminal 43 is disposed between the first and second terminals 41 and 42, in terms of the order of arrangement. Also, in terms of the order of arrangement, the second terminal 42 is disposed between the third terminal 43 and the fifth terminal (input terminal) 45. Also, the first terminal 41 is disposed closer than the third wiring pattern 33 to side of the first wiring pattern 31. Te second terminal 42 is disposed closer than the third wiring pattern 33 to the side of the second wiring pattern 32. The third terminal 43 is disposed between the first and second terminals 41 and 42.

As a result of the arrangement described above, the third wiring pattern 33 can be disposed without intersecting the first and second wiring patterns 31 and 32.

Next, operations of the electrode driving apparatus in accordance with the present embodiment will be described. Plural signals (voltages) are inputted through the fifth wiring pattern 35 to the fifth terminal 45. In the electronic component 40, the input signals are stored in a RAM, and required voltages and signals are generated. Then, the first electrode pattern (signal electrodes) 21 is driven by signals outputted from the first terminal 41 and inputted through the first wiring pattern 31. Also, the electronic circuit 36 is controlled by signals outputted from the second terminal 42, and the electronic circuit 36 drives the second electrode pattern (scanning electrodes) 22. The second terminal 42 also supplies power to the electronic circuit 36. The voltage (common voltage $V_{COM}$ outputted from the third terminal 43 is applied to the third electrode pattern 23 through the third wiring pattern 33. The voltage (common voltage $V_{COM}$ outputted from the fourth terminal 44 is also supplied to the third electrode pattern 23 through the fourth wiring pattern 34.

(Second Embodiment)

Figure 2:
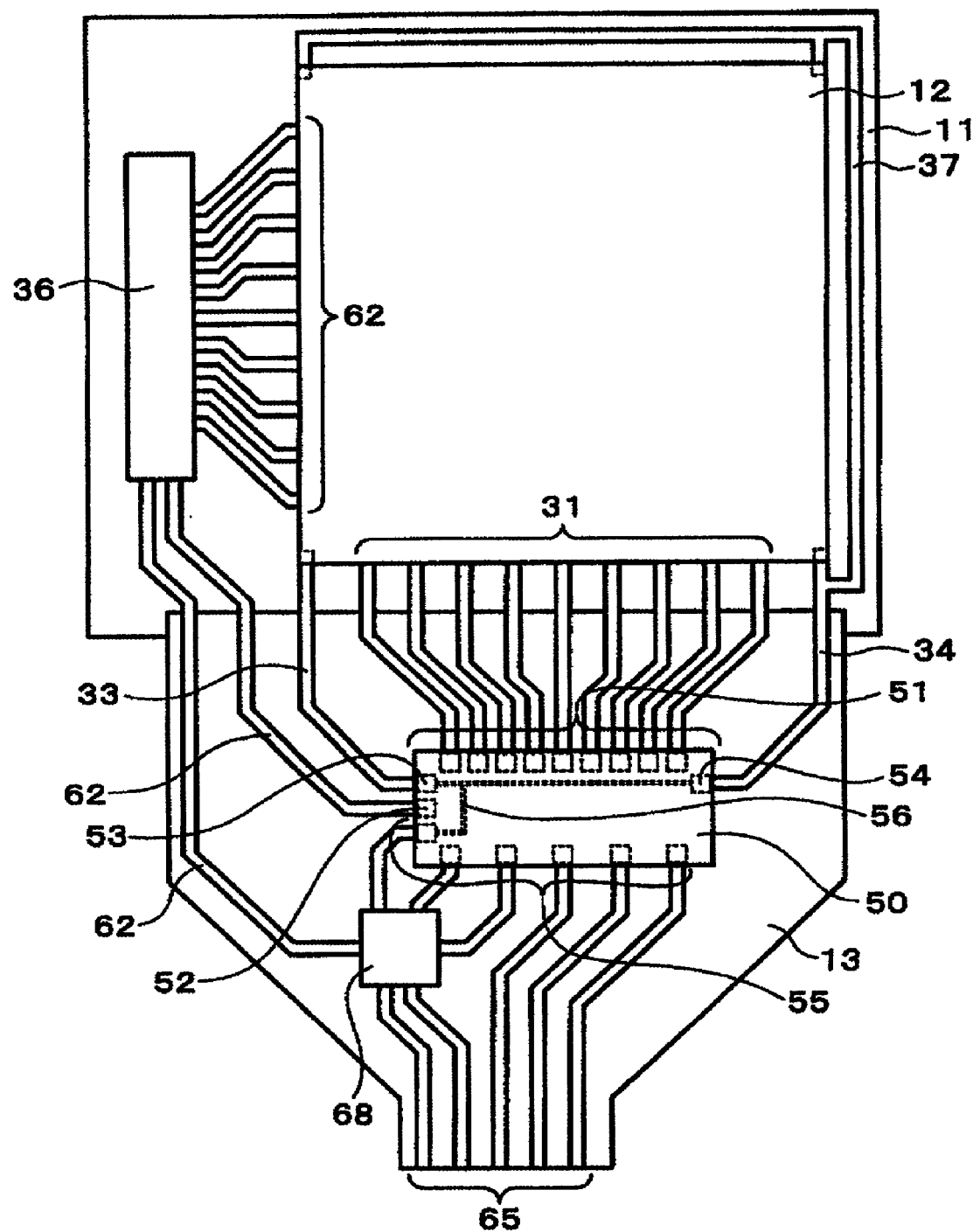
FIG. 2 shows an electrode driving apparatus in accordance with a second embodiment of the present invention.

FIG. 2 shows an electrode driving apparatus in accordance with a second embodiment of the present invention. This embodiment is an example of a modification of the first embodiment, and therefore description of the same components shall be omitted. The electrode driving apparatus of the present embodiment includes an electronic component 50. The electronic component 50 includes a path 56 that passes inputted signals to at least one of first through fourth terminals 51–54. Here, the signals include voltages and power supply, and could be common voltage $V_{COM}$. The path 56 may be provided with a circuit layout or a wiring layout that withstands a high voltage such that a signal of a higher voltage than the power supply voltage (for example, 1.8V, 3V) of the electronic component 50 can pass. As a result, the path 56 can pass a signal such as a common voltage $V_{COM}$ (for example, −1.0~4.0V with an amplitude of 5V). In the example shown in FIG. 2, one of plural terminals in a fifth terminal 55 is electrically connected to the third and fourth terminals 53 and 54 by the path 56. The path 56 is a wiring that does not have an active element. In this manner, since signals can pass within the electronic component 50, the third wiring pattern 33 can be disposed without intersecting the first and second wiring patterns 31 and 62.

The electrode driving apparatus in accordance with the present embodiment includes an electronic circuit 68. The electronic circuit 68 is a power supply circuit that generates required voltages or power supply. The electronic circuit 68 is electrically connected to a second wiring pattern 62 and supplies the power supply to the electronic circuit 36. Also, the electronic circuit 68 is electrically connected to the fifth terminal 55 of the electronic component 50. The power supply that is supplied from the electronic circuit 68 passes through the path 56 described above, and is supplied to a component external to the electronic component 50 (in the example shown in FIG. 2, it is supplied to the third electrode pattern 23 (see FIG. 1(A) through the third and fourth wiring patterns 33 and 34).

(Third Embodiment)

Figure 3:
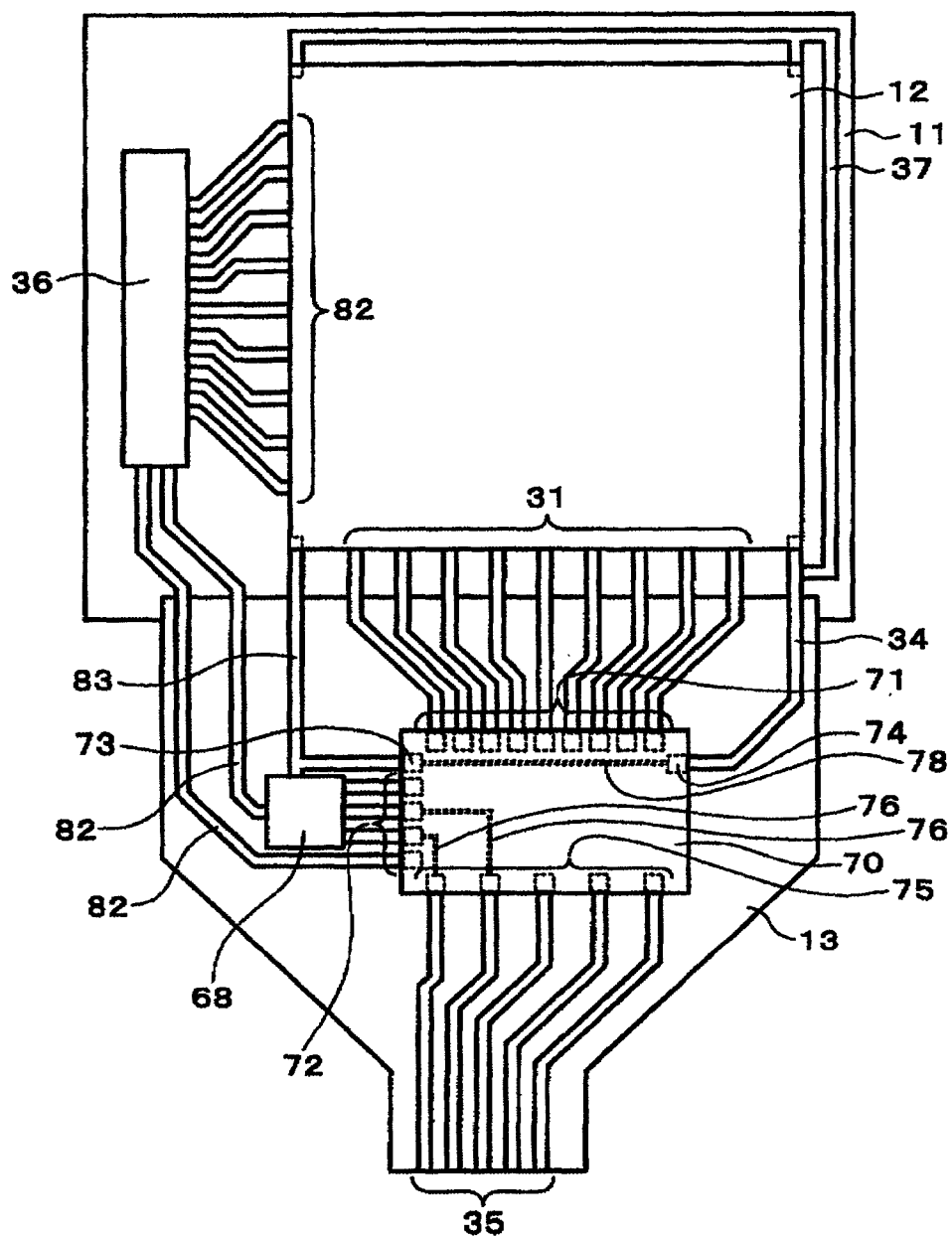
FIG. 3 shows an electrode driving apparatus in accordance with a third embodiment of the present invention.

FIG. 3 shows an electrode driving apparatus in accordance with a third embodiment of the present invention. This embodiment is an example of a modification of the first and second embodiments, and therefore description of the same components shall be omitted. The electrode driving apparatus of the present embodiment includes an electronic component 70. The electronic component 70 includes paths 76 and 78 that pass inputted signals to at least one of first through fourth terminals 71–74. Here, the signals include voltages and power supply, and could be a common voltage $V_{COM}$. The paths 76 and 78 may be provided with a circuit layout or a wiring layout that withstands a high voltage such that a signal of a higher voltage than the power supply voltage (for example, 1.8V, 3V) of the electronic component 70 can pass. As a result, the paths 76 and 78 can pass a signal such as a common voltage $V_{COM}$ (for example, −1.0~4.0V with an amplitude of 5V). In the example shown in FIG. 3, a fifth terminal 75 is electrically connected to the second terminal 72 by the path 76. The path 76 is a wiring that does not have an active element. The second terminal 72 is electrically connected to a second wiring pattern 82. It is noted that the second wiring pattern 82 electrically connects to an electronic circuit 68 between the second terminal 72 and an electronic circuit 36.

Also, the third terminal 73 is electrically connected to the fourth terminal 74 by the path 78. The path 78 is a wiring that does not have an active element. The third terminal 73 is electrically connected to a third wiring pattern 83, and the fourth terminal 74 is electrically connected to the fourth wiring pattern 34. It is noted that the third wiring pattern 83 is also electrically connected to the electronic circuit 68.

The paths 76 and 78 of the electronic component 70 allow signals to pass within the electronic component 70. Accordingly, the third or the fourth wiring pattern 83 or 34 can be disposed without intersecting the first or the second wiring pattern 31 or 82.

The electronic circuit 68 is a power supply circuit that generates required voltages or power supply. The electronic circuit 68 is electrically connected to the second wiring pattern 82 and supplies the power supply to the electronic circuit 36. Also, the electronic circuit 68 is electrically connected to the third wiring pattern 83 to supply the power supply. Also, the third wiring pattern 83 is electrically connected to the third terminal 73, such that the power supply supplied from the electronic circuit 68 passes through the path 78 described above, and is supplied to a component external to the electronic component 70 (in the example shown in FIG. 3, it is supplied to the third electrode pattern 23 (see FIG. 1(A) through the fourth wiring pattern 34).

(Fourth Embodiment)

Figure 4:
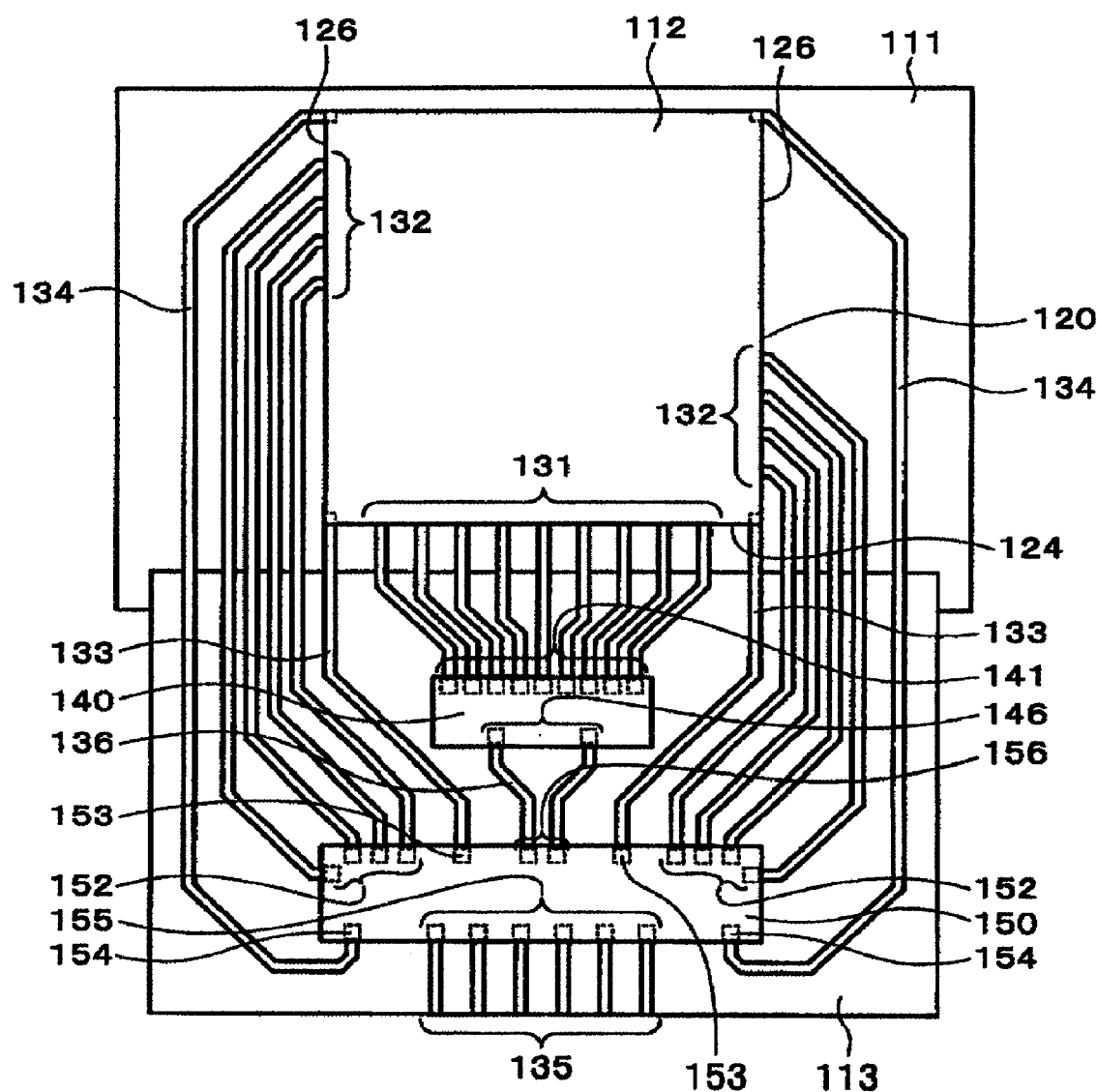
FIG. 4 shows an electrode driving apparatus in accordance with a fourth embodiment of the present invention.

FIG. 4 shows an electrode driving apparatus in accordance with a fourth embodiment of the present invention. The electrode driving apparatus includes first and second substrates 111 and 112 (which correspond to the first and second substrates 11 and 12 described in the first embodiment, respectively). In the present embodiment also, first and second electrode patterns (not shown) are arranged within a quadrilateral region 120 that is defined by an external peripheral shape of the second substrate 112. A third substrate 113 (which corresponds to the third substrate 13 described in the first embodiment) is attached to the first substrate 111.

The electrode driving apparatus includes first and second electronic components 140 and 150. The first and second electronic components 140 and 150 shown in FIG. 4 are mounted on the third substrate 113. Methods for mounting them are described in the first embodiment. The first component 140 is disposed adjacent to a first side 124 of the quadrilateral region 120. The first component 140 is disposed between the first side 124 and the second component 150.

Both of the first and second electronic components 140 and 150 are peripheral type components, and have plural terminals arranged around their edge sections. The first electronic component 140 has a first terminal 141 (which corresponds to the details of the first terminal 41 described in the first embodiment). The second electronic component 150 has a second terminal 152 (which corresponds to the details of the second terminal 42 described in the first embodiment). A third terminal 153 (which corresponds to the details of the third terminal 43 described in the first embodiment) is provided in either the first electronic component 140 or the second electronic component 150 (the second electronic component 150 in the example shown in FIG. 4). Also, one of the first and second electronic components 140 and 150 (the second electronic component 150 in the example shown in FIG. 4) includes fourth and fifth terminals 154 and 155 (which correspond to the details of the fourth and fifth terminals 154 and 155 described in the first embodiment). It is noted that the fifth terminal 155 is an input terminal. Further, the first and second electronic components 140 and 150 include sixth terminals 146 and 156, respectively.

A first wiring pattern 131 (which corresponds to the details of the first wiring pattern 31 described in the first embodiment) formed from the first side 124 is electrically connected to the first terminal 141.

A second wiring pattern 132 (which corresponds to the details of the second wiring pattern 32 described in the first embodiment) formed from a second side 126 is electrically connected to the second terminal 152. In the present embodiment, the second wiring pattern 132 is formed from each of the two second sides 126 that are adjacent to both ends of the first side 124.

In the present embodiment, two apexes are formed by the first side 124 and the two second sides 126. Third wiring patterns 133 are formed from positions respectively close to the two apexes. Other details of the third wiring pattern 133 correspond to the details of the third wiring pattern 33 described in the first embodiment.

In the present embodiment, a fourth wiring pattern 134 is formed from the second side 126 at a position closer than the second wiring pattern 132 to an end section (corner section) of the second side 126 on the opposite side of the first side 124. It is noted that two fourth wiring patterns 134 may be formed for the two second sides 126.

The electrode driving apparatus in accordance with the present embodiment includes a fifth wiring pattern 135 (which corresponds to the details of the first wiring pattern 35 described in the first embodiment). Also, a sixth wiring pattern (connection pattern) 136 is formed to electrically connect the sixth terminals 146 and 156 of the first and second electronic components 140 and 150.

The first terminal 141 is provided at an end section of the first electronic component 140, which is located on the side of the first side 124. Also, the first terminal 141 is provided on the opposite side of the sixth terminal 146.

In the second electronic component 150, the second terminal 152 is provided between the third terminal 153 and the fifth terminal (input terminal) 135, in terms of the order of arrangement. In terms of the order of arrangement, the third terminal 153 is provided between the sixth terminal 156 and the second terminal 152. In terms of order of arrangement, the second terminal 152 is provided between the third terminal 153 and the fourth terminal 154.

In the present embodiment, the third wiring pattern 133 is formed between the second wiring pattern 132 and the sixth wiring pattern (connection pattern) 136. Therefore, the third wiring pattern 133 can be formed without crossing the second wiring pattern 132. Also, the second wiring pattern 132 is formed between the third and fourth wiring patterns 133 and 134. As a result, the fourth wiring pattern 134 can be formed without crossing the second wiring pattern 132.

Other details correspond to the details described in the first embodiment. For example, the first terminal 141 is disposed closer than the third wiring pattern 133 to the side of the first wiring pattern 131. The second terminal 152 is disposed closer than the third wiring pattern 133 to the side of the second wiring pattern 132. The third terminal 153 is disposed between the first and second terminals 141 and 152. In other words, with a line (not shown) that passes the third terminal 153 (which may be the third wiring pattern 133) being defined as a boundary, the first terminal 141 is disposed on one of the sides, and the second terminal 152 is disposed on the other side. Since the present embodiment has the structure described above, multiple wirings can be formed without intersecting one another.

(Fifth Embodiment)

Figure 5:
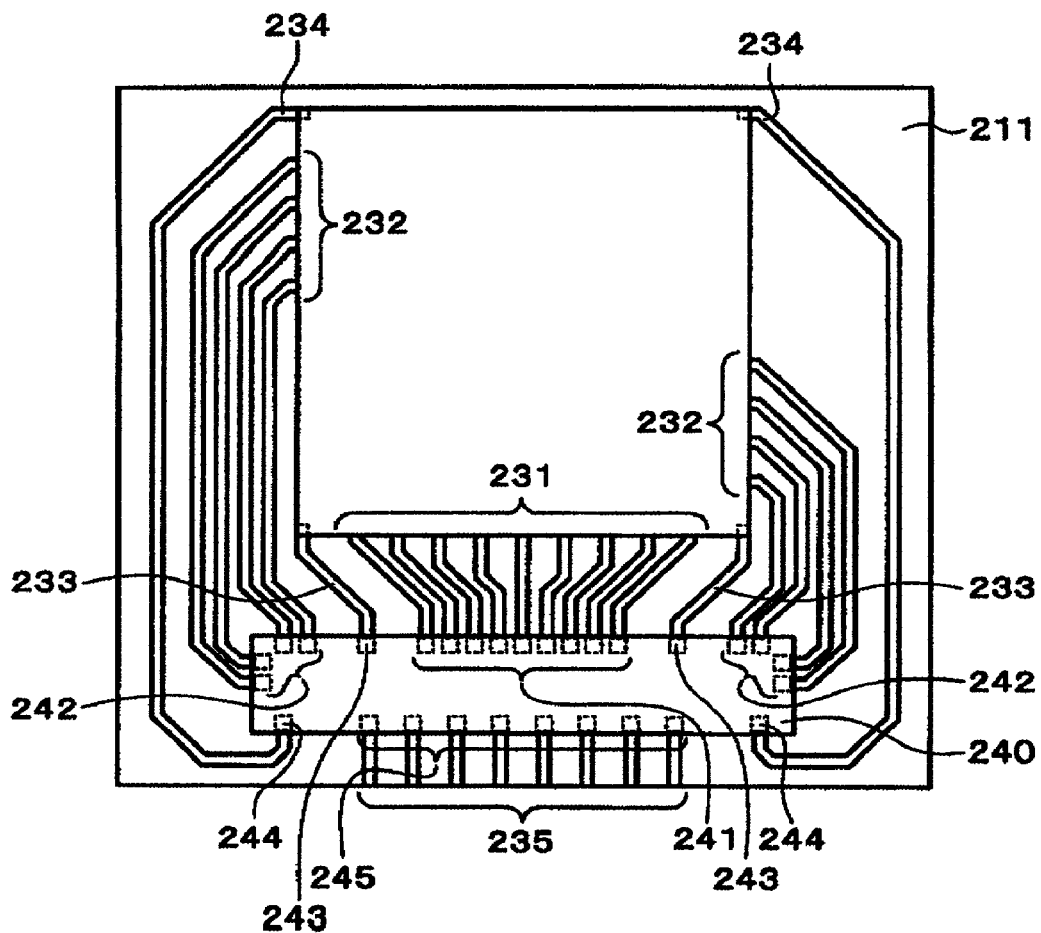
FIG. 5 shows an electrode driving apparatus in accordance with a fifth embodiment of the present invention.

FIG. 5 shows an electrode driving apparatus in accordance with a fifth embodiment of the present invention. In the present embodiment, an electronic component 240 is mounted on a substrate 211 (which corresponds to the details of the first substrate 11 described in the first embodiment (in a COG). Also, first through third wiring patterns 231–233 are formed on the first substrate 211.

The electronic component 240 corresponds to the details of the electronic component 40 described in the first embodiment, in view of the fact that it has first through fifth terminals 241–245. Also, the third and fourth terminals 243 and 244 of the electronic component 240 correspond to the details of the third and fourth terminals 153 and 154 of the second electronic component 150 described in the fourth embodiment. In other words, the electronic component 240 shown in FIG. 5 has a structure in which the sixth terminal 156 is removed from the second electronic component 150 shown in FIG. 4, and the first terminal 241 is provided instead.

The first through fifth wiring patterns 231–235 correspond to the details of the first through fifth wiring patterns 131–135 described in the fourth embodiment. However, the first wiring pattern 231 is also electrically connected to the electronic component 240. In the present embodiment, the details described in any of the embodiments described above is applicable. In the present embodiment also, plural wirings can be formed without intersecting one another. It is noted that, in the present embodiment, the electronic component 240 is mounted on the first substrate 211. However, a third substrate may be provided and the electronic component 240 may be mounted on the third substrate. The details described in the first embodiment are also applicable in this case.

Figure 6:
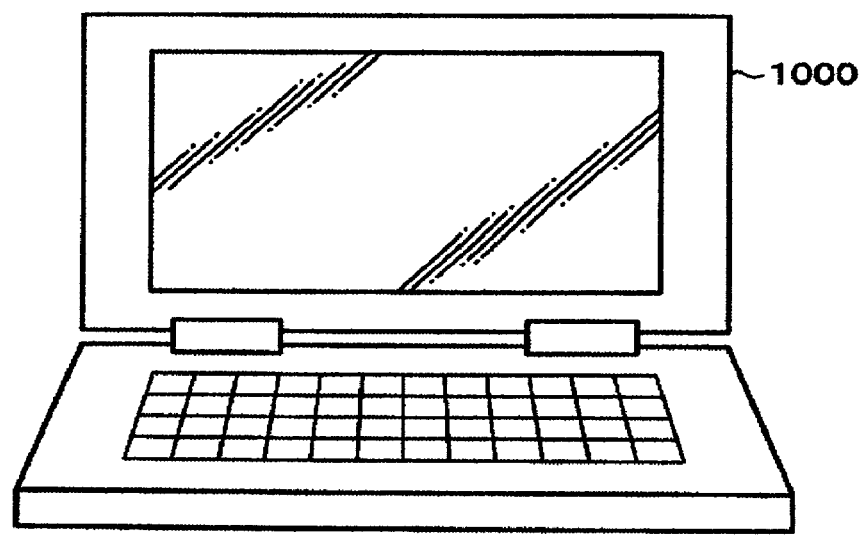
FIG. 6 shows electronic equipment in accordance with one embodiment of the present invention.
Figure 7:
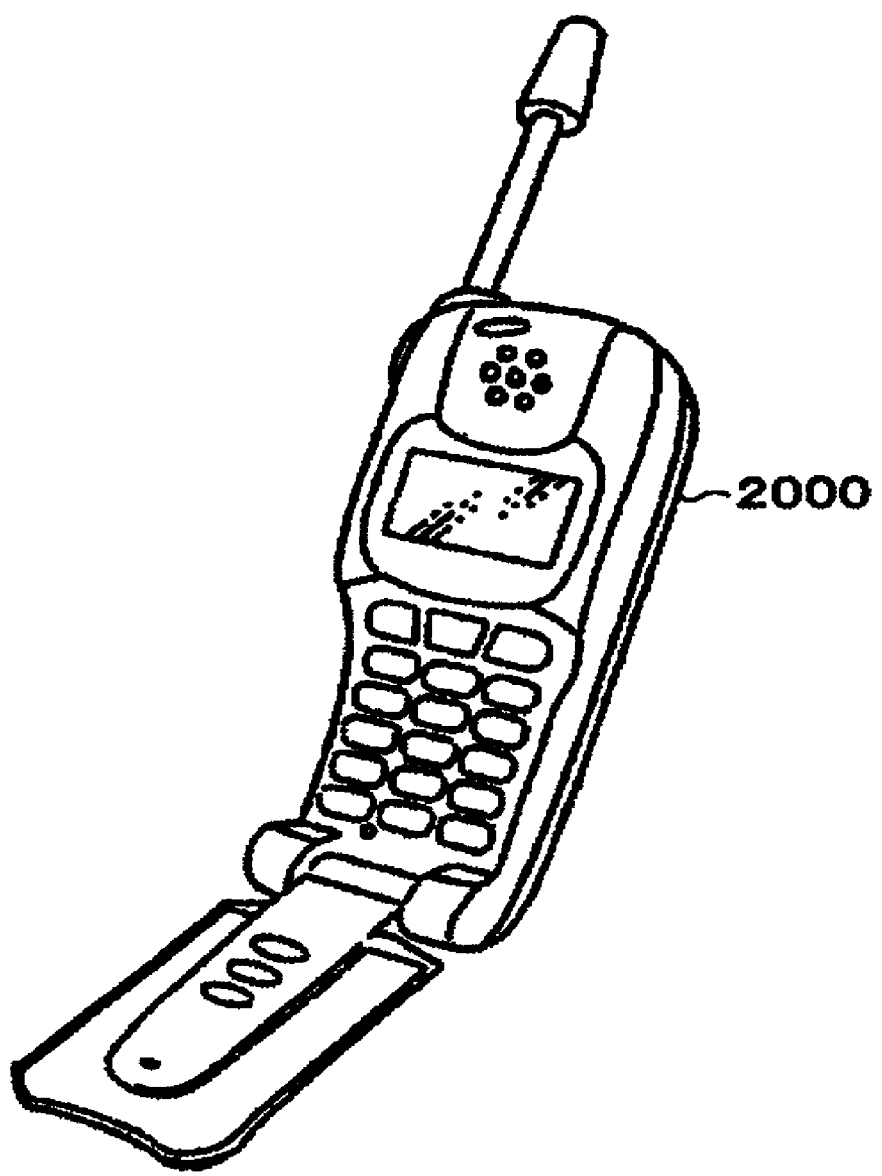
FIG. 7 shows electronic equipment in accordance with one embodiment of the present invention.

As electronic equipment that has an electrode driving apparatus in accordance with any of the embodiments described above, FIG. 6 shows a notebook type personal computer 1000, and FIG. 7 shows a mobile telephone 2000.

The present invention is not limited to the embodiments described above, and many modifications can be made. For example, the present invention includes structures that are substantially the same as the structures in the embodiments described above (for example, a structure having the same function, method and result, or a structure having the same object and results). Also, the present invention includes structures in which portions of the structures in the embodiments described above that do not constitute essential parts may be replaced. Also, the present invention includes structures that achieve the same functions and effects as those of the structures in the embodiments described above, and structures that achieve the same objects. Also, the present invention includes structures in which prior art is added to the structures in the embodiment described above. The entire disclosure of Japanese Patent Application No. 2001-120502 filed Apr. 19, 2001 is incorporate by reference herein.

The invention claimed is:

1. An electrode driving apparatus comprising:
    first and second electrode patterns arranged in a quadrilateral region;
    a first substrate having the first and second electrode patterns formed therein;
    a first wiring pattern electrically connected to the first electrode pattern and formed outwardly from a first side of the quadrilateral region;
    a second wiring pattern electrically connected to the second electrode pattern and formed outwardly from a second side adjacent to the first side of the quadrilateral region;
    a third wiring pattern independent of the first and second electrode patterns extending outward from a corner of the quadrilateral region between the first side and the second side and positioned between the first wiring pattern and the second wiring pattern;
    a second substrate disposed opposite to the first substrate;
    a third electrode pattern formed in the second substrate and electrically connected to the third wiring pattern;
    a first electronic component including a first terminal electrically connected to the first wiring pattern; and
    a second electronic component including a second terminal electrically connected to the second wiring pattern and a third terminal electrically connected to the third wiring pattern, a first distance between the first and the second terminals is greater than a second distance between the third terminal and at least one of the first terminal and the second terminal;
    wherein the first electronic component is between the quadrilateral region and the second electronic component such that the first electronic component is closer to the quadrilateral region than the second electronic component.

2. An electrode driving apparatus according to claim 1, wherein the first and second electrode patterns are formed in a matrix.

3. An electrode driving apparatus according to claim 1, wherein a third substrate is mounted on the first substrate, at least one of the first and second electronic components are mounted on the third substrate and the first, second and third wiring patterns are formed on the first substrate and the third substrate.

4. An electrode driving apparatus according to claim 1, wherein at least one of the first and second electronic components are mounted on the first substrate and the first, second and third wiring patterns are formed on the first substrate.

5. An electrode driving apparatus according to claim 1, wherein at least one of the first and the second electronic components is a peripheral type components, the third terminal is arranged between the first terminal and the second terminal.

6. An electrode driving apparatus according to claim 5, wherein at least one of the first and second electronic components has an input terminal and the second terminal is disposed between the third terminal and the input terminal.

7. An electrode driving apparatus according to claim 1, further comprising a connection pattern that electrically connects the first and second electronic components, wherein the third wiring pattern is disposed between the second wiring pattern and the connection pattern.

8. An electrode driving apparatus according to claim 1, wherein the second electronic component has an input terminal, and the second terminal is disposed between the third terminal and the input terminal.

9. An electrode driving apparatus according to claim 1, further comprising an electronic circuit that is electrically connected to the second wiring pattern.

10. An electrode driving apparatus according to claim 1, further comprising an electronic circuit that is electrically connected to the third wiring pattern.

11. An electrode driving apparatus according to claim 1, wherein at least one of the first and second electronic components generate a signal to be outputted from at least one of the first, second and third terminals.

12. An electrode driving apparatus according to claim 1, wherein at least one of the first and second electronic components have a path that passes an input signal to at least one of the first, second and third terminals.

13. An electrode driving apparatus according to claim 12, wherein the path passes a signal with a voltage higher than a power supply voltage of at least one of the first and the second electronic components.

14. An electrode driving apparatus according to claim 13, wherein the signal with a voltage higher than the power supply voltage is a common voltage $V_{COM}$.

15. An electrode driving apparatus according to claim 1, further comprising a fourth wiring pattern that is drawn out from the corner section of the quadrilateral region at a point other than an apex of the corner and is electrically connected to the third electrode pattern, and a fourth terminal provided on at least one of the first and second electronic components and electrically connected to the fourth wiring pattern.

16. An electrode driving apparatus according to claim 15, wherein the fourth wiring pattern is provided for supplying a common voltage $V_{COM}$.

17. An electrode driving apparatus according to claim 15, wherein the second wiring pattern is disposed between the third wiring pattern and the fourth wiring pattern.

18. An electrode driving apparatus according to claim 15, wherein at least one of the first and the second electronic components generate a signal to be outputted from the fourth terminal.

19. An electrode driving apparatus according to claim 15, wherein at least one of the first and the second electronic components have a path that passes an input signal to the fourth terminal.

20. An electrode driving apparatus according to claim 1, wherein the third wiring pattern supplies a common voltage $V_{COM}$.

21. An electrode driving apparatus according to claim 1, wherein an electrooptic material is provided between the first substrate and the second substrate to form an electrooptic apparatus.

22. An electronic equipment comprising the electrode driving apparatus set forth in claim 21.

23. An electrode driving apparatus according to claim 1, wherein a liquid crystal is provided between the first substrate and the second substrate to form a liquid crystal apparatus.

* * * * *